US010223829B2

(12) United States Patent
Wu et al.

(10) Patent No.: US 10,223,829 B2
(45) Date of Patent: Mar. 5, 2019

(54) METHOD AND APPARATUS FOR GENERATING A CLEANED OBJECT MODEL FOR AN OBJECT IN A MAPPING DATABASE

(71) Applicant: HERE Global B.V., Eindhoven (NL)

(72) Inventors: Guangli Wu, San Mateo, CA (US);
Jeffrey Adachi, El Cerrito, CA (US);
Ian Endres, Naperville, IL (US);
Victor Lu, Chicago, IL (US); Antonio Haro, Walnut Creek, CA (US)

(73) Assignee: HERE Global B.V., Eindhoven (NL)

( * ) Notice: Subject to any disclaimer, the term of this patent is extended or adjusted under 35 U.S.C. 154(b) by 68 days.

(21) Appl. No.: 15/366,670

(22) Filed: Dec. 1, 2016

(65) Prior Publication Data

US 2018/0158235 A1  Jun. 7, 2018

(51) Int. Cl.
*G06T 17/05* (2011.01)
*G06T 19/20* (2011.01)
(Continued)

(52) U.S. Cl.
CPC ............... *G06T 17/05* (2013.01); *G06T 7/00* (2013.01); *G06T 7/0032* (2013.01); *G06T 19/20* (2013.01); *G06T 7/344* (2017.01); *G06T 17/20* (2013.01); *G06T 2207/20148* (2013.01); *G06T 2207/20221* (2013.01); *G06T 2207/30184* (2013.01);
(Continued)

(58) Field of Classification Search
CPC ........... G06T 2207/10028; G06T 17/05; G06T 2200/04; G06T 2210/56; G06T 2200/08; G06T 17/00; G06T 2207/30184; G06T 7/521; G06T 7/73; G06T 2207/10032; G06T 7/50; G06K 9/00671;
(Continued)

(56) References Cited

U.S. PATENT DOCUMENTS 8,284,190 B2   10/2012  Muktinutalapati et al.
9,633,483 B1 *  4/2017  Xu ........................ G06T 19/20
(Continued)

OTHER PUBLICATIONS

Becker, Susanne, and Norbert Haala. "Refinement of building fassades by integrated processing of LIDAR and image data." International Archives of Photogrammetry, Remote Sensing and Spatial Information Science 36 (2007): 7-12. (Year: 2007).*
(Continued)

*Primary Examiner* — Gregory J Tryder
*Assistant Examiner* — Scott E Sonners
(74) *Attorney, Agent, or Firm* — Ditthavong & Steiner, P.C.

(57) ABSTRACT

An approach is provided for generating a cleaned object model to represent an object in a mapping database. The approach includes receiving point cloud data depicting the object. The approach also includes processing the point cloud data to determine one or more surface points of the point cloud data. The one or more surface points represent one or more surfaces of the object. The approach further includes cutting a model of the object into one or more fragments using the one or more surface points. The one or more fragments include one or more object fragments and one or more non-object fragments. The approach further includes designating the one or more object fragments as the cleaned object model to represent the object in the mapping database.

20 Claims, 13 Drawing Sheets

(51) Int. Cl.
*G06T 17/20* (2006.01)
*G06T 7/00* (2017.01)
*G06T 7/33* (2017.01)

(52) U.S. Cl.
CPC .... *G06T 2210/56* (2013.01); *G06T 2219/008* (2013.01); *G06T 2219/2021* (2013.01)

(58) Field of Classification Search
CPC .. G06K 9/00214; G06K 9/00624; G06K 9/78; G06K 9/00201; G06K 9/0063
See application file for complete search history.

(56) References Cited

U.S. PATENT DOCUMENTS

| | | | |
|---|---|---|---|
| 2008/0221843 | A1 | 9/2008 | Shenkar et al. |
| 2011/0181589 | A1* | 7/2011 | Quan ............... G06T 17/05 345/420 |
| 2012/0148162 | A1* | 6/2012 | Zhang ............... G06T 7/11 382/195 |
| 2013/0202197 | A1 | 8/2013 | Reeler et al. |
| 2014/0267254 | A1 | 9/2014 | Sievert et al. |
| 2015/0268058 | A1* | 9/2015 | Samarasekera .... G06K 9/00637 701/409 |
| 2016/0342862 | A1* | 11/2016 | Liu ..................... G06T 15/04 |
| 2017/0243404 | A1* | 8/2017 | Morales ................ G06T 5/30 |

OTHER PUBLICATIONS

Berger, Matthew, et al. "A survey of surface reconstruction from point clouds." Computer Graphics Forum. vol. 36. No. 1. 2017. (Year: 2017).*

Musialski, Przemyslaw, et al. "A survey of urban reconstruction." Computer graphics forum. vol. 32. No. 6. 2013. (Year: 2013).*

Becker et al., "Refinement of Building Facades by Integrated Processing of Lidar and Image Data", In: Stilla U et al., (Eds) PIA07. International Archives of Photogrammetry, Remote Sensing and Spatial Information Sciences, 36 (3/W49A), Sep. 19-21, 2007, pp. 7-12.

Kedzierski et al., "Terrestrial and Aerial Laser Scanning Data Integration Using Wavelet Analysis for the Purpose of 3d Building Modeling", Sensors (Basel), vol. 14(7); PMC4168497, Jul. 7, 2014, pp. 12070-12092.

* cited by examiner

METHOD AND APPARATUS FOR GENERATING A CLEANED OBJECT MODEL FOR AN OBJECT IN A MAPPING DATABASE

BACKGROUND

Providers of mapping-related services are continually challenged to accurately map and represent features and objects (e.g., buildings, trees, cars, other structures, etc.) in a mapping database. For example, one area of development has been in three-dimensional mapping, which historically has been dependent on manual effort for generating accurate models (e.g., three-dimensional models) of map features or objects. However, because of the vast numbers of objects that may be present in a mapped geographical area, manually creating models for each object or feature can be a significant resource burden. To reduce this burden, service providers can use, for instance, aerial or satellite photogrammetry to create surface models of a large geographical area (e.g., an entire city) from which individual object models can be extracted. Extracting models in this way, however, can result in models that include additional artifacts beyond the object being modeled (e.g., an extracted building object may include both the building and an adjacent tree, car, or other nearby structure). Accordingly, service providers face significant technical challenges for efficiently removing these artifacts from object models.

SOME EXAMPLE EMBODIMENTS

Therefore, there is a need for an approach for generating a cleaned object model for an object in a mapping database.

According to one embodiment, a method comprises receiving point cloud data depicting the object. The method also comprises processing the point cloud data to determine one or more surface points of the point cloud data. The one or more surface points represent one or more surfaces of the object. The method further comprises cutting a model of the object into one or more fragments using the one or more surface points. The one or more fragments include one or more object fragments and one or more non-object fragments. The method further comprises designating the one or more object fragments as the cleaned object model to represent the object in the mapping database.

According to another embodiment, an apparatus comprises at least one processor, and at least one memory including computer program code for one or more computer programs, the at least one memory and the computer program code configured to, with the at least one processor, cause, at least in part, the apparatus to receive point cloud data depicting the object. The apparatus is also caused to process the point cloud data to determine one or more surface points of the point cloud data. The one or more surface points represent one or more surfaces of the object. The apparatus is further caused to cut a model of the object into one or more fragments using the one or more surface points. The one or more fragments include one or more object fragments and one or more non-object fragments. The apparatus is further caused to designate the one or more object fragments as the cleaned object model to represent the object in the mapping database.

According to another embodiment, a non-transitory computer-readable storage medium carries one or more sequences of one or more instructions which, when executed by one or more processors, cause, at least in part, an apparatus to receive point cloud data depicting the object. The apparatus is also caused to process the point cloud data to determine one or more surface points of the point cloud data. The one or more surface points represent one or more surfaces of the object. The apparatus is further caused to cut a model of the object into one or more fragments using the one or more surface points. The one or more fragments include one or more object fragments and one or more non-object fragments. The apparatus is further caused to designate the one or more object fragments as the cleaned object model to represent the object in the mapping database.

According to another embodiment, an apparatus comprises means for receiving point cloud data depicting the object. The apparatus also comprises means for processing the point cloud data to determine one or more surface points of the point cloud data. The one or more surface points represent one or more surfaces of the object. The apparatus further comprises means for cutting a model of the object into one or more fragments using the one or more surface points. The one or more fragments include one or more object fragments and one or more non-object fragments. The apparatus further comprises means for designating the one or more object fragments as the cleaned object model to represent the object in the mapping database.

According to another embodiment, a method comprises classifying one or more points of point cloud data into one or more wall points and one or more non-wall points. The point cloud data includes a depiction of the building. The method also comprises generating models of one or more walls of the building based on the one or more wall points. The method further comprises cutting a model representing the building based on the one or more wall models to generate the cleaned object model. The method further comprises storing the cleaned object model in the mapping database. The cleaned object model is used to generate a visual representation of the building in a mapping user interface.

According to another embodiment, an apparatus comprises at least one processor, and at least one memory including computer program code for one or more computer programs, the at least one memory and the computer program code configured to, with the at least one processor, cause, at least in part, the apparatus to classify one or more points of point cloud data into one or more wall points and one or more non-wall points. The point cloud data includes a depiction of the building. The apparatus is further caused to generate models of one or more walls of the building based on the one or more wall points. The apparatus is further caused to cut a model representing the building based on the one or more wall models to generate the cleaned object model. The apparatus is further caused to store the cleaned object model in the mapping database. The cleaned object model is used to generate a visual representation of the building in a mapping user interface.

According to another embodiment, a non-transitory computer-readable storage medium carries one or more sequences of one or more instructions which, when executed by one or more processors, cause, at least in part, an apparatus to classify one or more points of point cloud data into one or more wall points and one or more non-wall points. The point cloud data includes a depiction of the building. The apparatus is further caused to generate models of one or more walls of the building based on the one or more wall points. The apparatus is further caused to cut a model representing the building based on the one or more wall models to generate the cleaned object model. The apparatus is further caused to store the cleaned object model in the mapping database. The cleaned object model is used to generate a visual representation of the building in a mapping user interface.

According to another embodiment, an apparatus comprises means for classifying one or more points of point cloud data into one or more wall points and one or more non-wall points. The point cloud data includes a depiction of the building. The apparatus also comprises means for generating models of one or more walls of the building based on the one or more wall points. The apparatus further comprises means for cutting a model representing the building based on the one or more wall models to generate the cleaned object model. The apparatus further comprises means for storing the cleaned object model in the mapping database. The cleaned object model is used to generate a visual representation of the building in a mapping user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating a cleaned object model for an object in a mapping database, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
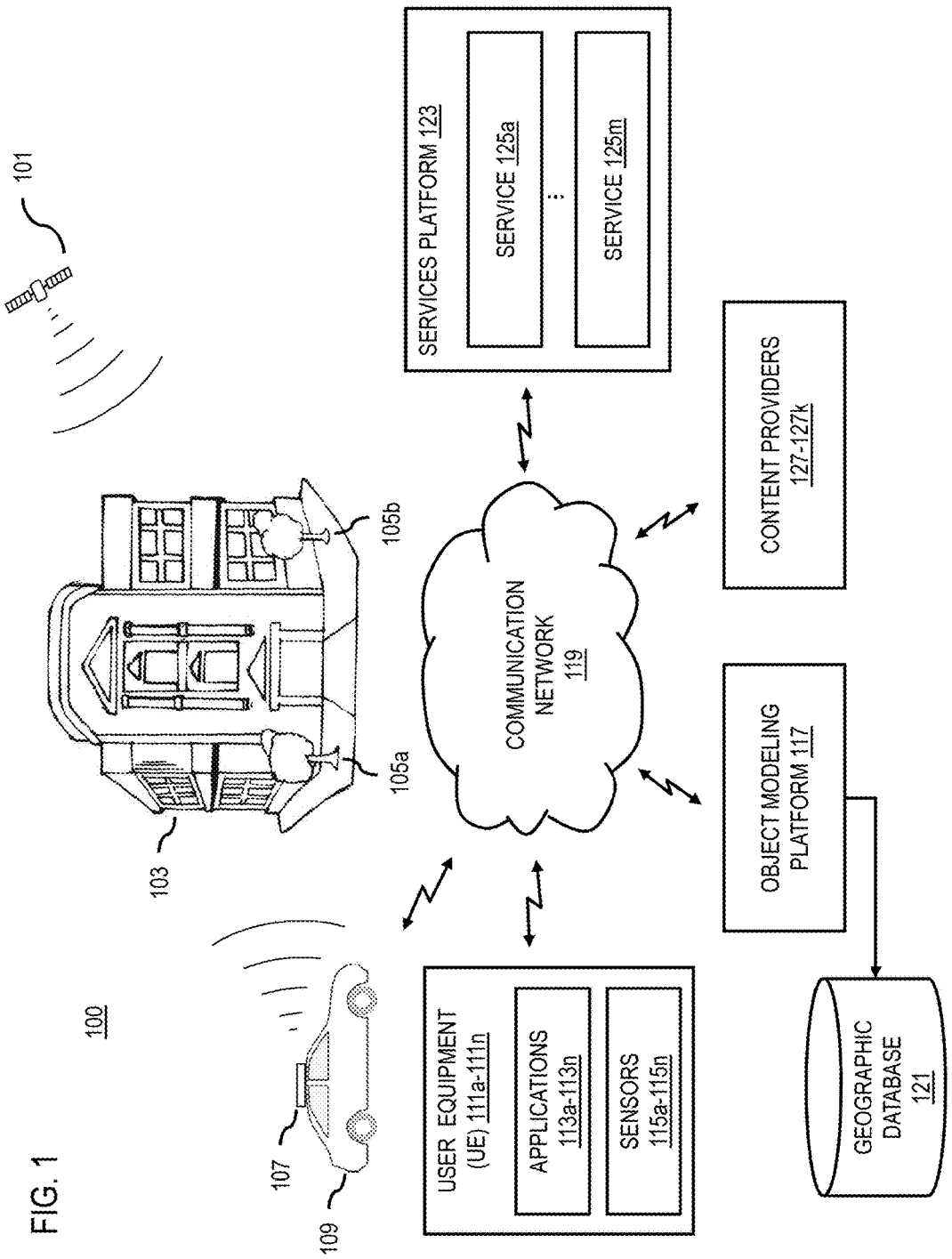
FIG. 1 is a diagram of a system capable of generating a cleaned object model for an object, according to one embodiment.

FIG. 1 is a diagram of a system capable of generating a cleaned object model for an object, according to one embodiment. As noted above, object models are essential features in map services across different platforms. As used herein models or object models refer to computer-based representations of individual objects (e.g., a building or other structure or feature) that may be present in a mapped geographical area. For example, the model can represent a physical location, surfaces, dimensions, shape, properties, etc. of a respective object using a mathematical or other representation. One example of such a mathematical representation includes, but is not limited to, a polygon extrusion. In one embodiment, the model can be a two-dimensional representation (e.g., an object footprint), a two and half dimensional representation (e.g., an object footprint in combination with a height), or a full three-dimensional representation.

In one embodiment, a system 100 of FIG. 1 can generate the object models using any known mechanism or process. One example of such a process is extraction of the object models from a surface model. In one embodiment, a surface model is a single triangulated surface or triangular mesh that represents or depicts a large geographical area (e.g., an entire city). The surface model, for instance, can be generated from aerial or satellite photogrammetry. FIG. 1 illustrates an example in which a satellite 101 is used to collect sensed data (e.g., image data and/or any other surveying data collected by any other surveying sensors equipped in the satellite 101) about an object 103 (e.g., a building object) and its geographical surroundings to generate the surface model. In addition or alternatively, the sensed data can also be collected or received from other sources such as from an airplane equipped with cameras, LiDAR, or other surveying technologies (not shown). In one embodiment, the process for extracting object models from surface models include determining regions of interest (ROIs) of the surface models which correspond to individual objects (e.g., buildings, trees, cars, other structures, etc.) based on the geometry of the surface model.

However, when multiple objects are in close proximity and particularly when the objects have similar heights (e.g., trees 105a and 105b—also collectively referred to as trees 105—next to the building object 103), the multiple objects may be included in the same candidate object model. In some cases, trees 105 and/or other surface model artifacts can result in object models that include multiple individual objects (e.g., multiple buildings, trees, etc.) or even multiple individual objects that are on different sides of a city street. Even using image information associated with the surface mode, it can be difficult or computationally expensive to recover the original objects from the candidate model.

Figure 2:
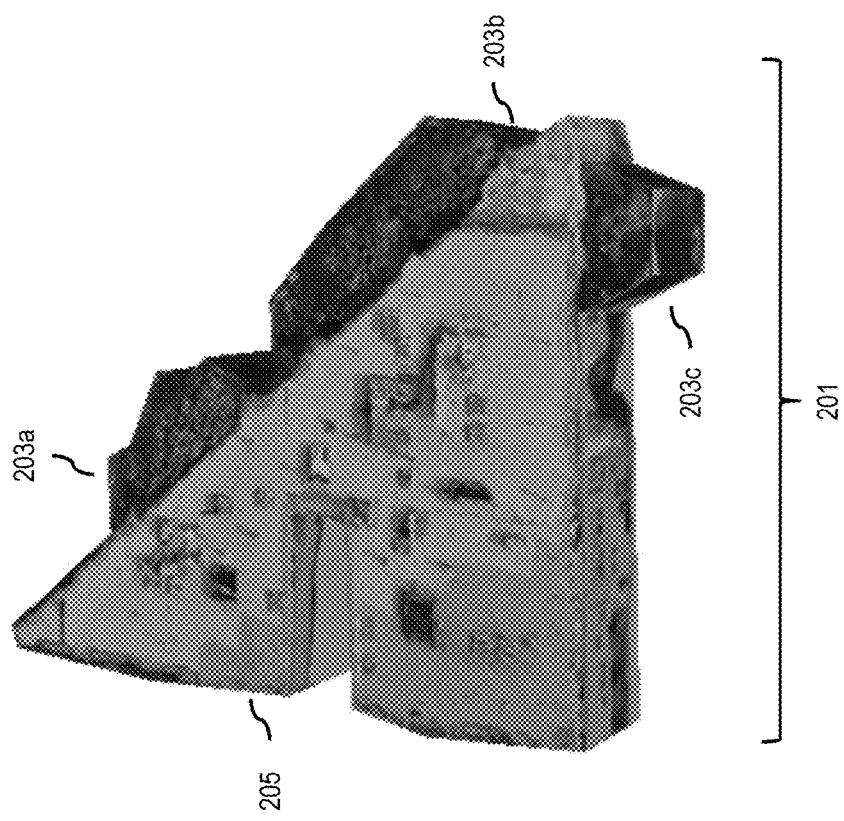
FIG. 2 is diagrams of an object model with problematic artifacts, according to one embodiment.

FIG. 2 illustrates an example of an object model 201 that suffers from problematic artifacts. In this example, the object model 201 incorrectly includes tree fragments 203a, 203b, and 203c (e.g., corresponding to the trees 105) that were in close proximity to a building 205 (e.g., the target object 103). This type of error can prevent the system 100 from generating high-quality object models (e.g., building models) that accurately represent objects in mapping related services. Manually reviewing and fixing such modeling errors at this scale would require significant resources.

Returning to FIG. 1, to address this problem, the system 100 introduces a capability to clean up object models (e.g., models generated from aerial/satellite photogrammetry or any model generating means) by cutting the object models using surface features of the object determined from point cloud data depicting the same object. In a use case where the objects of interest are buildings, street level point cloud data can be processed to extract building walls which are examples of surface features of an object. The walls or surface features can then be used to generate wall models of the building or object. In one embodiment, the system then uses the wall models to cut the object model so that the boundaries of the object model conform to the wall models. The cut object model represents the cleaned object model of the building or other object of interest. Although various embodiments are discussed with respect to buildings as the objects being modeled, it is contemplated that any object or feature (e.g., road structures, natural features, etc.) occurring in a mapped geographic area can be modeled.

In other words, in one embodiment, the system 100 uniquely fuses point cloud data (e.g., street level point cloud data, such as mobile LiDAR data) with separately generated object models (e.g., object or building models generated via aerial/satellite photogrammetry) to generate high-quality object models that have been cleaned of problematic artifacts. As shown in FIG. 1, the aerial or satellite data used in the photogrammetry process to generate the surface models or mesh data from which the individual object models can be generated by the satellite 101 or other sensor-equipped aerial means (e.g., an airplane, drone, helicopter, or other aerial vehicle). For example, the satellite 101 can capture image data of target object 103 and/or its surrounding area for processing by photogrammetry to generate individual object models. In the example of FIG. 1, within vicinity of the target object 103 are two nearby trees 105a and 105b (also collectively referred to as trees 105). As shown in FIG. 2, because of the proximity of the trees 105 to the target 103, a resulting model 201 of the target object 103 can potentially incorporate the trees 105 as problematic artifacts 203a, 203b, and 203c.

As also shown, the point cloud data (e.g., mobile LiDAR data) can be collected using a sensor 107 (e.g., LiDAR sensor) mounted on a vehicle 109 traveling in the area of the target object 103. In one embodiment, the point cloud data is a collection of multiple individual points defined within a coordinate system (e.g., a latitude, longitude, and elevation in three-dimensional coordinate system). For example, with respect to LiDAR measurements, each individual point within the point cloud data represents a coordinate of a point at which laser light emitted from the LiDAR sensor is reflected back to the sensor. The collection of points then can be plotted in three-dimensional space to depict an outline of the surfaces of the target object 103 that reflected the laser light. In one embodiment, because the vehicle 109 travels at a street level, the point cloud data depicts the target object 103 from a street level perspective. In one embodiment, the perspective or sensor 107 pose information can be stored or otherwise associated with the point cloud data. This perspective or pose information, for instance, can be used to facilitate data alignment.

In addition or alternatively, the point cloud data and/or the object models can be captured or generated using one or more user equipment 111a-111n (also collectively referred to as UEs 111). The UEs 111 are, for instance, mobile devices that can be respectively configured with data collection applications 113a-113n (also collectively referred to as applications 113) and sensors 115a-115n (also collectively referred to as sensors 115) for generating point cloud data and/or data for building object objects. By way of example, the sensors 115 include, but are not limited to, mobile LiDAR sensors, cameras, stereo cameras, video cameras, infrared cameras, mobile RADAR sensors, and/or any other surveying sensors.

Accordingly, in one embodiment, the system 100 takes inputs from at least two data sources: (1) point cloud data (e.g., street level point cloud generated from mobile LiDAR) and (2) object models (e.g., three-dimensional polygon extrusions generated from aerial or satellite photogrammetry). In one embodiment, the object models and point cloud data from the data sources are received by an object modeling platform 117 over a communication network 119. In one embodiment, the object models and/or point cloud data can stored in or retrieved from a geographic database 121. In one embodiment, the object modeling platform 117 performs the functions related to generating a cleaned object model as described with respect to the various embodiments discussed herein. For example, the object modeling platform 117 can align both data sources. The object modeling platform 117 can extract surface features (e.g., building walls) from the point cloud data to adjust the boundaries of the object models to generate the cleaned object models.

In one embodiment, the object modeling platform 117 adjusts the boundaries of the object models by cutting the object models into multiple fragments using the surface features determined from the point cloud data. In one embodiment, the surface features can be used to cut the object model into object fragments (e.g., fragments of the object model that fall within the object boundary) and non-object fragments (e.g., fragments of the object model that fall outside the object boundary). The fragments that are determined to be object fragments are then designated as the cleaned object model.

In one embodiment, the object modeling platform 117 can evaluate or process information on features of a model fragment and/or features of the portions of the point cloud data that correspond to generate a score to indicate a likelihood that fragment is either an object fragment or a non-object fragment (e.g., either a building fragment or a non-building fragment such as a nearby tree that was erroneously included in the object model). The determination of whether the fragment is an object fragment or a non-object fragment can then be based on the generated score.

In one embodiment, the object modeling platform 117 can also use the features of the model fragment and/or the corresponding portion of the point cloud data to train a machine learning classifier to classify each individual fragment as either an object or a non-object fragment. By using features of both the fragment and point cloud data, the system 100 can more accurately train the machine learning classifier to achieve more accurate classification results.

In one embodiment, the object modeling platform 117 can further process or evaluate the object fragments. The modeling platform 117 can determine whether multiple object fragments share one or more edges, and then merge them into a single cleaned object model based on the determination.

By way of example, the UE 111 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the UE 111 can be a component of or otherwise associated with the vehicle 109. It is also contemplated that the UE 111 can support any type of interface to the user (such as "wearable" circuitry, etc.).

In one embodiment, the vehicle 109 may have cellular or Wi-Fi connection either through inbuilt communication equipment or from the UE 111 associated with the vehicle 109.

In one embodiment, the applications 113 executing on the UE 111 or the vehicle 109 may assist in conveying sensor information via the communication network 119. By way of example, the applications 113 may be any type of application that is executable at the UE 111 or the vehicle 109, such as location-based service applications, navigation applications, mapping application, sensor monitoring applications, sensor data collection applications, calendar applications, content provisioning services, camera/imaging application, media player applications, social networking applications, and the like. In one embodiment, one or more of the applications 113 may act as a client for the object modeling platform 117 and may perform one or more functions associated with the functions of the object modeling platform 117 by interacting with the object modeling platform 117 over the communication network 119.

As discussed above, the system 100 may also include sensors 107 of the vehicle 109 and sensors 115 of the UEs 111. By way of example, the sensors 107 and 115 may be any type of sensor, which may interface with or be included in the satellite 101, the vehicle 109, and/or the UEs 111. In certain embodiments, the sensors 107 and/or 115 may include, for example, a global positioning sensor for gathering location data (e.g., GPS, Inertial Measurement Unit), a network detection sensor for detecting wireless signals or receivers for different short-range communications (e.g., Bluetooth, Wi-Fi, Li-Fi, near field communication, etc.), temporal information sensor, a camera/imaging sensor for gathering image data (e.g., monoscopic or stereoscopic cameras), an audio recorder for gathering audio data, and the like. In one scenario, the sensors 107 and/or 115 may include, light sensors, orientation sensors augmented with height sensing and acceleration sensing, tilt sensors to detect the degree of incline or decline of the vehicle along a path of travel, moisture sensors, pressure sensors, etc. In another embodiment, the sensors 107 and/or 115 may be a LiDAR device or sensor, a laser device, and/or other surveying device that collects data points, such as three dimensional data, by transmitting and receiving light. For example, the LiDAR sensors use one or more lasers to collect data points representing on-ground objects in a surrounding area. The LiDAR sensors may collect and gather data points in a point cloud, such as a three dimensional point cloud, in which each data point corresponds to a local coordinate, such as (x, y, z). In one scenario, LiDAR sensors not only collect street level (i.e., outdoor) 3D point clouds, but also indoor three dimensional point clouds.

By way of example, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

Figure 4:
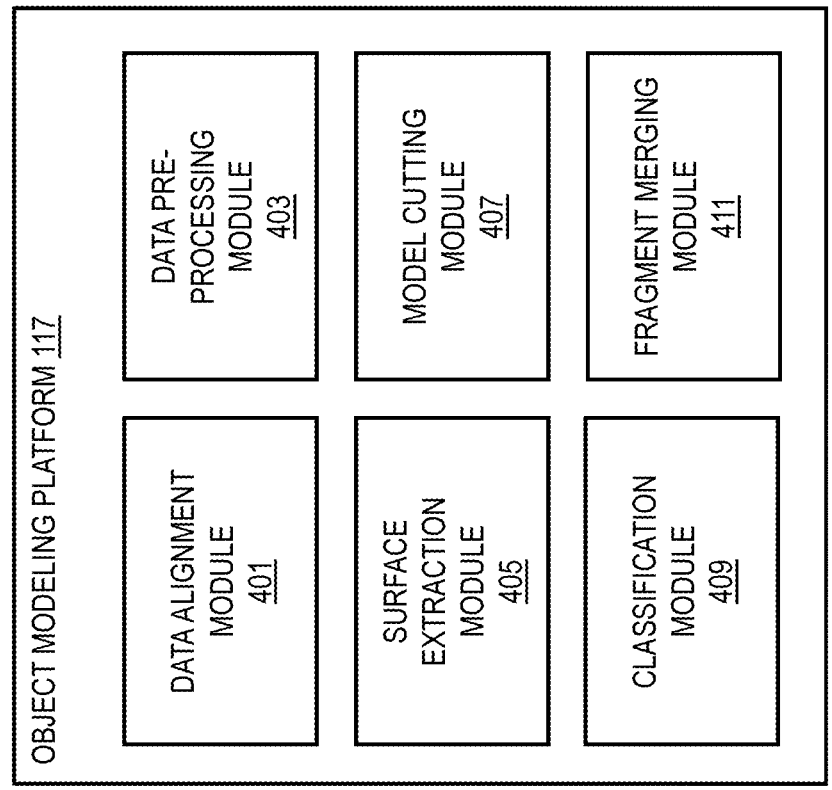
FIG. 4 is a diagram of an object modeling platform, according to one embodiment.

In one embodiment, the object modeling platform 117 may include multiple interconnected components. The object modeling platform 117 may include multiple servers, intelligent networking devices, computing devices, algorithms, components and corresponding software for classifying objects that are present at a geo-location and providing an uncluttered presentation of images of some of the objects in an application such as a map application. Example components of the object modeling platform 117 is illustrated in FIG. 4 and further discussed below.

In one embodiment, the object modeling platform 117 may include or have access to the geographic database 121 to access or store any kind of data, such as object models, point cloud data, one or more contextually relevant geo-location points, location proximity information, temporal information, contextual information, historical user information, etc. Data stored in the geographic database 113 may, for instance, be provided by the satellite 101, the sensors 107, the vehicle 109, the UEs 111, a services platform 123, one or more services 125a-125m (also collectively referred to as services 125), and/or one or more content providers 127a-127k (also collectively referred to as content providers 127). In one embodiment, the geographic database 121 may also include data about places, such as cities, towns, or other communities, and other geographic features, such as bodies of water, mountain ranges, buildings, etc. The geographic database 121 may be maintained by the content providers 127 in association with the services platform 123 (e.g., a map developer). The map developer may collect geographic data to generate and enhance the geographic database 121. The data may be obtained from various sources, such as municipalities or respective geographic authorities. In addition, direct collection (e.g., via a fleet of sensor equipped vehicles 109 using, for instance, mobile LiDAR), and/or remote sensing (e.g., aerial or satellite photography, and/or aerial LiDAR), may be used.

The services platform 123 may include any type of service 125 that can read or write to the geographic database 121. By way of example, the services platform 123 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services platform 123 may interact with the object modeling platform 117 to supplement or aid in the processing of generating cleaned object models according to the various embodiments described herein. For example, the services platform 123 and/or the services 125 may provide: (1) object models; (2) point cloud data; (3) alignment information for aligning the models and point cloud data; and/or (4) classification information for classifying object models, model fragments, points with the point cloud data, etc.

The content providers 127 may also read or write to the geographic database 121 to provide content to the object modeling platform 117, and the services 125 of the services platform 123. The content provided may be any type of content, such as object models, point cloud data, and related information (e.g., alignment information, classification information, etc.). Other examples of content include, but are not limited to, textual content, image content, video content etc. In one embodiment, the content providers 127 may also store content or data associated the object modeling platform 117, the services 125 of the services platform 123, and/or any other component of the system 100. In a further embodiment, the content providers 127 may manage access to a central repository of data, and offer a consistent, standard interface to data.

By way of example, the object modeling platform 117 may communicate over the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
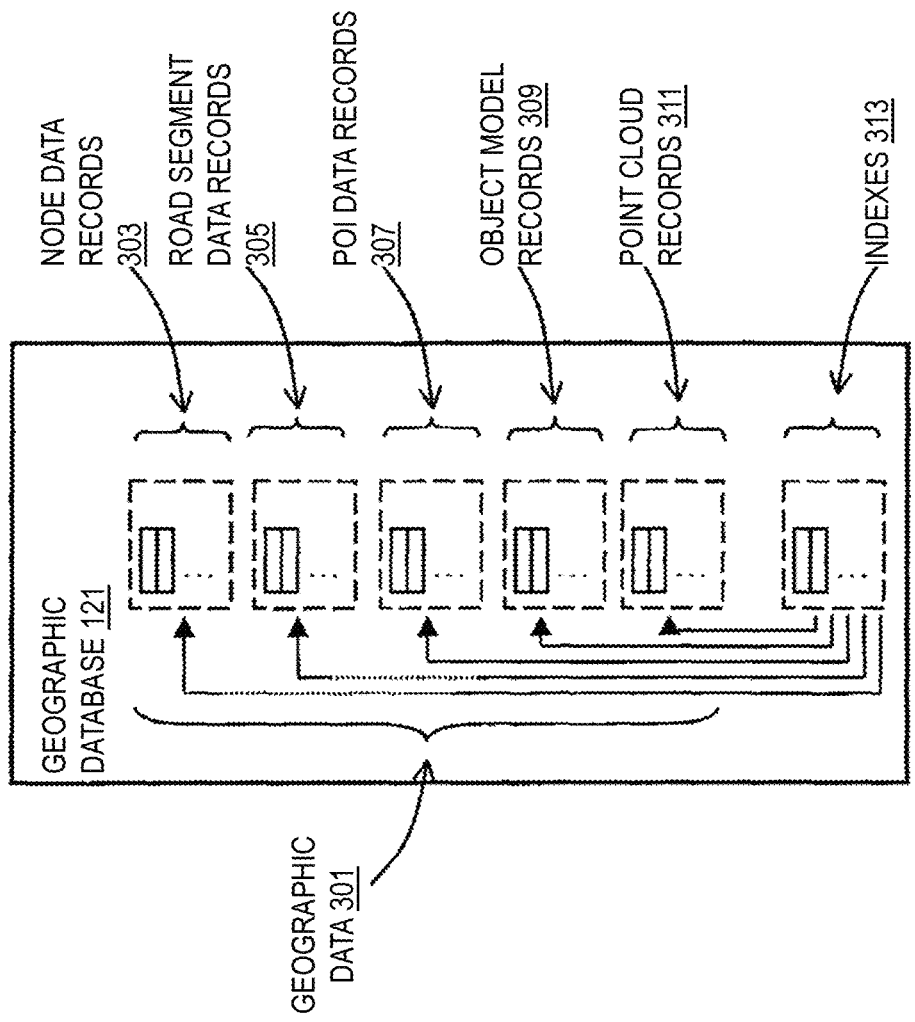
FIG. 3 is a diagram of a geographic database, according to one embodiment.

FIG. 3 is a diagram of the geographic database 121 of system 100, according to exemplary embodiments. In the exemplary embodiments, object models (e.g., cleaned and unleaded), model fragments, point cloud data, and/or related information (e.g., data alignment information, classification information, etc.) can be stored, associated with, and/or linked to the geographic database 121 or data thereof. In one embodiment, the geographic database 121 includes geographic data 301 used for (or configured to be compiled to be used for) mapping and/or navigation-related services, such as for personalized route determination, according to exemplary embodiments. For example, the geographic database 121 includes node data records 303, road segment or link data records 305, POI data records 307, object model records 309, point cloud records 311, and indexes 313, for example. More, fewer or different data records can be provided. In one embodiment, additional data records (not shown) can include cartographic ("carto") data records, routing data, and maneuver data. In one embodiment, the indexes 313 may improve the speed of data retrieval operations in the geographic database 121. The indexes 313 may be used to quickly locate data without having to search every row in the geographic database 121 every time it is accessed.

In exemplary embodiments, the road segment data records 305 are links or segments representing roads, streets, or paths, as can be used in the calculated route or recorded route information for determination of one or more personalized routes, according to exemplary embodiments. The node data records 303 are end points corresponding to the respective links or segments of the road segment data records 305. The road link data records 305 and the node data records 303 represent a road network, such as used by vehicles, cars, and/or other entities. Alternatively, the geographic database 121 can contain path segment and node data records or other data that represent pedestrian paths or areas in addition to or instead of the vehicle road record data, for example.

In one embodiment, the object model records 309 store information on surface models of a geographical area or a portion of the geographical area represented in geographic database 121. As noted above, the surface model can be stored as mesh data (e.g., a triangular mesh of polygons depicting the surface contours of an entire geographic area). The individual object models are models of individual objects (e.g., buildings, structures, trees, other features, etc.) occurring in the mapped geographic area of the database 121. The object models are stored as, for instance, a mathematical representation of the surfaces or features of the object. For example, the object model can be represented as polygon extrusion or other representation. In one embodiment, point cloud records 311 stores the point cloud data corresponding to more or more objects, one or more geographical areas, etc. represented in the geographic database 121.

In one embodiment, the geographic database 121 can be maintained by the content provider 127 in association with the services platform 123 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database 121 or data in the master geographic database 121 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the object modeling platform 117, vehicle 109, and/or UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 121 can be a master geographic database, but in alternate embodiments, the geographic database 121 can represent a compiled navigation database that can be used in or with end user devices (e.g., vehicle 109, UE 111, etc.) to provide navigation-related functions. For example, the geographic database 121 can be used with the end user device to provide an end user with navigation features. In such a case, the geographic database 121 can be downloaded or stored on the end user device (e.g., vehicle 109, UE 111, etc.), such as in application 113, or the end user device can access the geographic database 121 through a wireless or wired connection (such as via a server and/or the communication network 119), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 111) can be a cellular telephone. An end user can use the device navigation functions such as guidance and map display, for example, and for determination of route information to at least one identified point of interest, according to exemplary embodiments.

FIG. 4 is a diagram of the components of the object modeling platform 117, according to one embodiment. By way of example, the object modeling platform 117 may include one or more components for generating a cleaned object model for an object in a mapping database (e.g., the geographic database 121). In one embodiment, the object modeling platform 117 includes a data alignment module 401, a data pre-processing module 403, a surface extraction module 405, a model cutting module 407, a classification module 409, and a fragment merging module 411. It is contemplated that the functions of these components may be combined in one or more components or performed by other components with similar functionalities. The functions of these components are described with respect to FIG. 5 which illustrates an example process 500 for building a cleaned object model, according to one embodiment.

Figure 5:
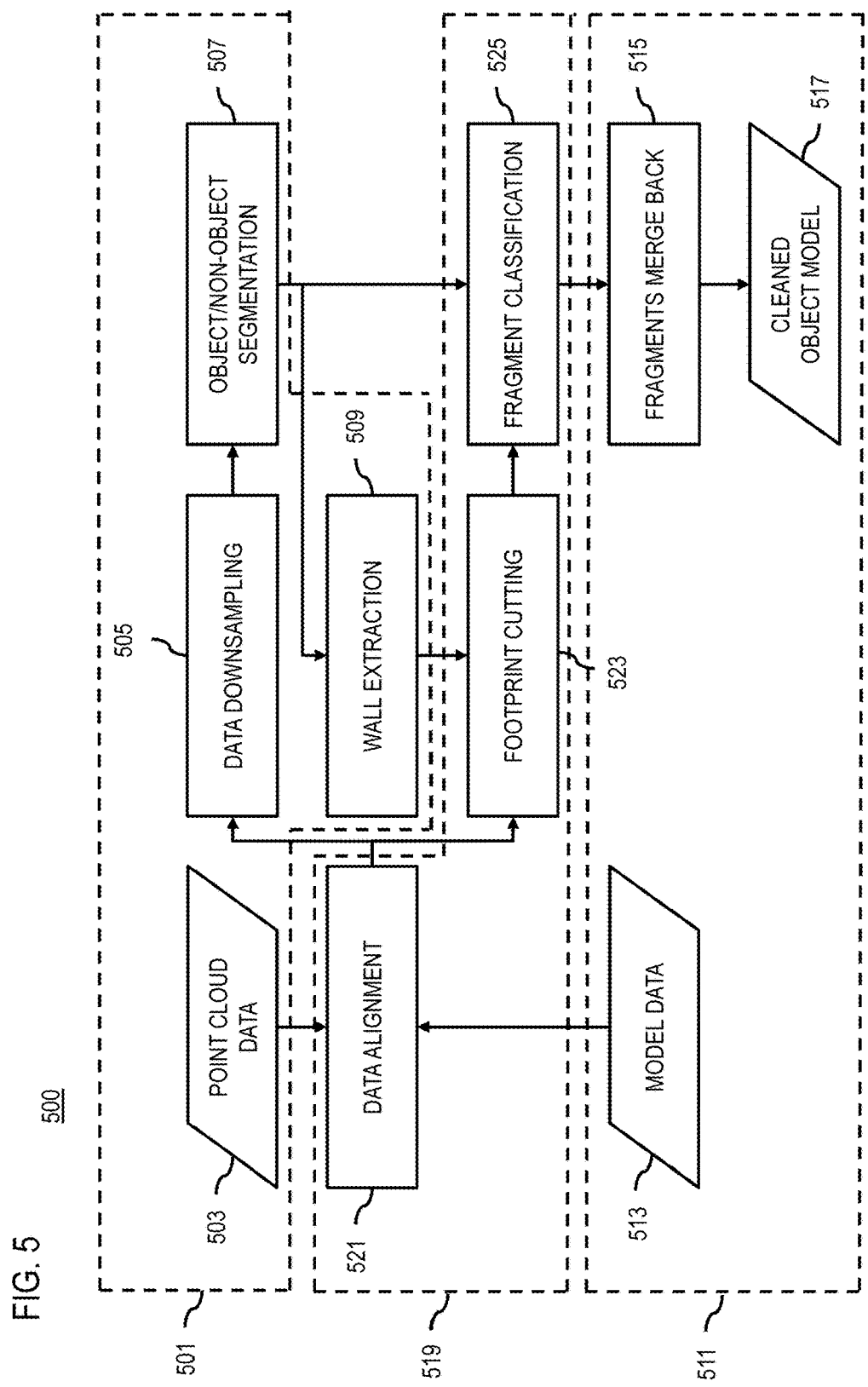
FIG. 5 is a diagram of an example process for building a cleaned object model with respect to components of the object modeling platform, according to one embodiment.

As shown in FIG. 5, the process 500 is divided into three portions depending on the data sources on which the portions operate (e.g., point cloud data, object model data, and/or fused point cloud/object model data). For example, portion 501 relates to processing point cloud data and includes the following: point cloud data 503 representing a point cloud data source, process 505 for downsampling the point cloud data 503, process 507 for segmenting the point cloud data 503 into object and non-object points (e.g., building/non-building points), and process 509 for extracting walls or other object surfaces from the point cloud data

503. Portion 511 relates to processing object model data and includes the following: model data 513 representing object models that are to be cleaned, process 515 for merging object fragments back into a cleaned object model 517, and cleaned object model 517 representing an object model processed according to the various embodiments described herein to remove problematic artifacts. Portion 519 relates to processing fused point cloud/object model data and includes the following: process 521 for performing a data alignment of the point cloud data 503 and the object model data 513, process 523 for cutting the object model data 513 using the point cloud data 503, and a process 525 for classifying model fragments cut from the object model data 513. It is contemplated the processes described with respect to the process 500 can be performed in any combination or sub-combination, and not all described processes need be performed.

In one embodiment, the data alignment module 401 of FIG. 4 initiates the process 500 by performing the data alignment process 511. In one embodiment, the point cloud data 503 and the object model data 513 can come from different sources, and their location coordinates can be affected by location drift (e.g., inertial measurement unit (IMU) drift), tall buildings (e.g., weak GPS signals and/or multi-path effects), sensor device differences, differences in location accuracy or resolution (e.g., centimeter accuracy for LiDAR versus relatively low resolution for models generated from aerial or satellite photogrammetry), etc.

Accordingly, in one embodiment, the data alignment module 401 can use, for instance, a two-step data alignment process to align the point cloud data 503 to the model data 513 (e.g., LIDAR to Mesh alignment) for processing. For example, the data alignment module 401 converts a digital surface model (e.g., triangular mesh or polygons) in a region near the model data into 3D points. In one embodiment, the data alignment module 401 then aligns the mesh derived points of the object model data 513 to the points of the point cloud data 503. This alignment is performed using, for instance, an iterative closest point (ICP) algorithm.

In addition or alternatively, the data alignment module 401 can extract non-coplanar surfaces from both the object model data 513 and the point cloud data 503. The data alignment module 401 can then match the corresponding surfaces of each of the data sources together to align the object model data 513 and the point cloud data 503. In one embodiment, the data alignment module 401 extracts at three or more non-coplanar surface from each of the data sources to perform matching. This matching can provide alignment accuracy in all three dimensions.

In one embodiment, the data alignment module 401 may receive multiple sets of point cloud data 503 (e.g., from different vehicles 109 and/or UEs 111 sensing the same area or same target object 103). In this case, the data alignment module 401 can also use an ICP algorithm to align the different sets of point cloud data 503. In addition or alternatively, the data alignment module 401 can extract non-planar features (e.g., light poles, traffic signs, lane stripes, etc.) from each of the different sets of point cloud data 503 to align the different sets. By using both ICP alignment and non-planar surfaces alignment, the data alignment can bring alignment residue down to improve alignment accuracy.

In one embodiment, the data pre-processing module 403 can pre-process the point cloud data 503 to reduce computer resource requirements and increase processing efficiency by performing the downsampling process 505. For example, which LiDAR is used to generate the point cloud data 503, the resulting point cloud typically is dense because of the typically high sampling rates and resolution of the technology. In many cases, the density is more than needed for the object model cleanup embodiments described herein. Accordingly, in one embodiment, the data pre-processing module 403 downsamples the point cloud data 503 to reduce the number points in the point cloud data 503. By way of example, the downsampling can be performed in uniform density (e.g., points are removed uniformly from the point cloud data 503). However, it is also contemplated that that the downsampling can be performed using any process or means to can reduce the number of point within the point cloud data 503 before further processing.

In one embodiment, following the downsampling process 505 (if performed) or after the data alignment process 521 (if downsampling 505 is not performed), the pre-processing module 403 can further process the point cloud data 503 to classify individual points with the point cloud data 503 as a surface or non-surface point. In one embodiment, if the point cloud data includes a depiction of a building, the point cloud data can be classified as being a building or a non-building point (e.g., a wall or non-wall point in the context of a building object). In one embodiment, the pre-processing module 403 processes the point cloud data 503 to find surfaces (e.g., of a building or target object) present in the points of the point cloud data 503. The pre-processing module 403 can then user features such as surface normal, area size, elevation, and the like with respect to the surfaces or models representing the surfaces to extract points belonging to the object (e.g., belonging to a building) and points belonging to non-object features (e.g., trees, cars, lamp posts, signs, etc. near a building when the building is the object of interest).

In one embodiment, after the point cloud data is pre-processed, the surface extraction module 405 processes the points of the point cloud data 503 that are classified as object or building points to extract models representing surfaces or walls of the object or building by performing the wall extraction process 509. In one embodiment, the models of surfaces or walls can be extracted by applying a random sample consensus (RANSAC) algorithm to fit a wall or surface model to the points classified as belonging to the object or building. The RANSAC algorithm is an iterative method for finding data points on a surface whose position, orientation and extent are unknown. Compared to least squares methods, the RANSAC algorithm is robust with respect to clutter (non-surface points and points on multiple surfaces) in the data points.

In one embodiment, after a set of wall or surface models are obtained using the process above, the surface extraction module 405 connects the wall or surface models from end to end to form a connected polyline. In one embodiment, multiple wall polylines in one building or object is possible since the point cloud data 503 may not include every wall (e.g., because the underlying LiDAR data does not see every wall). In one embodiment, a polyline can also be a closed loop if all walls or surfaces are visible in the point cloud data 503 (e.g., visible to LiDAR). In addition, if the point cloud data 503 includes interior walls or surfaces of the object or building, the surface extraction module 405 can discard them. For example, interior walls may be present or depicted in the point cloud data 503 if the building or object has a surface or opening (e.g., a large window) that is transparent to the laser used by a LiDAR sensor. In one embodiment, the polyline(s) determined by the surface extraction module 405 is considered by the system 100 to be the true boundary or footprint of the object or building of interest.

In one embodiment, the model cutting module 407 then uses the determined polyline (e.g., representing an object or building boundary) to cut the object model data 513 into model fragments. For example, for a polygon based object model, polygon cutting can be performed to create fragments that fall within the boundaries of the polyline and fragments that are outside the boundaries of the polyline. In one embodiment, each of the model fragments can be considered as new candidate objects that can be further or iteratively processed for cleanup according to the embodiments described herein. In one embodiment, the model fragments that are within the boundaries of the polyline or footprint (e.g., object fragments) are designated as the cleaned object model 517 to represent the object, while the model fragments that fall outside the boundaries of the polyline or footprint (e.g., non-object fragments) may be further processed.

In one embodiment, the classification module 409 can perform the fragment classification process 525 to determine a probability that a model fragment is either an object fragment or a non-object fragment (e.g., building or non-building fragments). In one embodiment, the probability is further used to classify the fragments generated above as either object or non-object fragments. As part of this classification process, the classification module 409 can use non-building or non-object points of the point could data 503 that were segmented in the process 507 above to classify the fragments. By way of example, these non-building points comprise point cloud representations of objects such as the ground, trees, cars, possible indoor ceilings visible from a LiDAR laser, etc. These non-building points can then be used to estimate features of a fragment of interest such as a percentage of ground area coverage by the point cloud data inside the model fragment. The features are then used to calculate a score for each fragment, with a higher score indicating a greater likelihood of being an object fragment.

In one embodiment, the classification module 409 can use labeled data to train a machine learning classifier (e.g., decision trees, Naieve Bayes, Support Vector Machine, Deep Learning, etc.) to perform the classification of the fragments. In one embodiment, the machine learning classifier uses features drawn from both the object model data 513 and the point cloud data 503 corresponding to the fragment of interest for training and classification. In one embodiment, the classification module 409 can classify model fragments that score above a threshold value as the cleaned object model 517.

In one embodiment, after the fragments are classified, the fragment merging module 411 can further evaluate the object fragments for possible merging under the fragments merge back process 515. For example, adjacent object fragments can be potentially part of the real object or building if the fragments share one or more common edges. In this case, the fragment merging module 411 can merge those fragments into a single cleaned object model 517.

Figure 6:
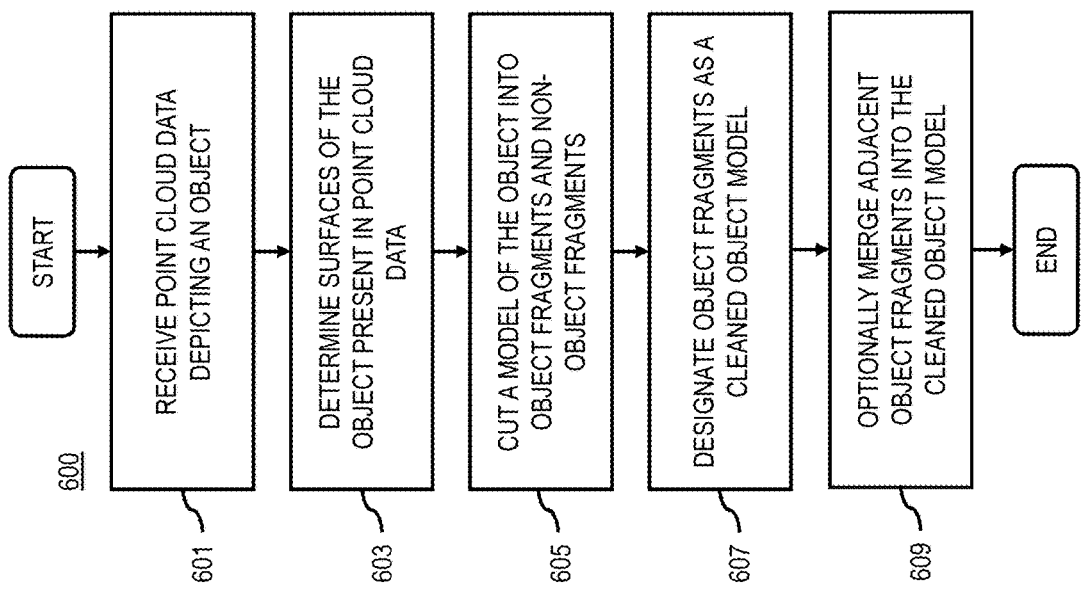
FIG. 6 is a flowchart of a process for generating a cleaned object model, according to one embodiment.
Figure 10:
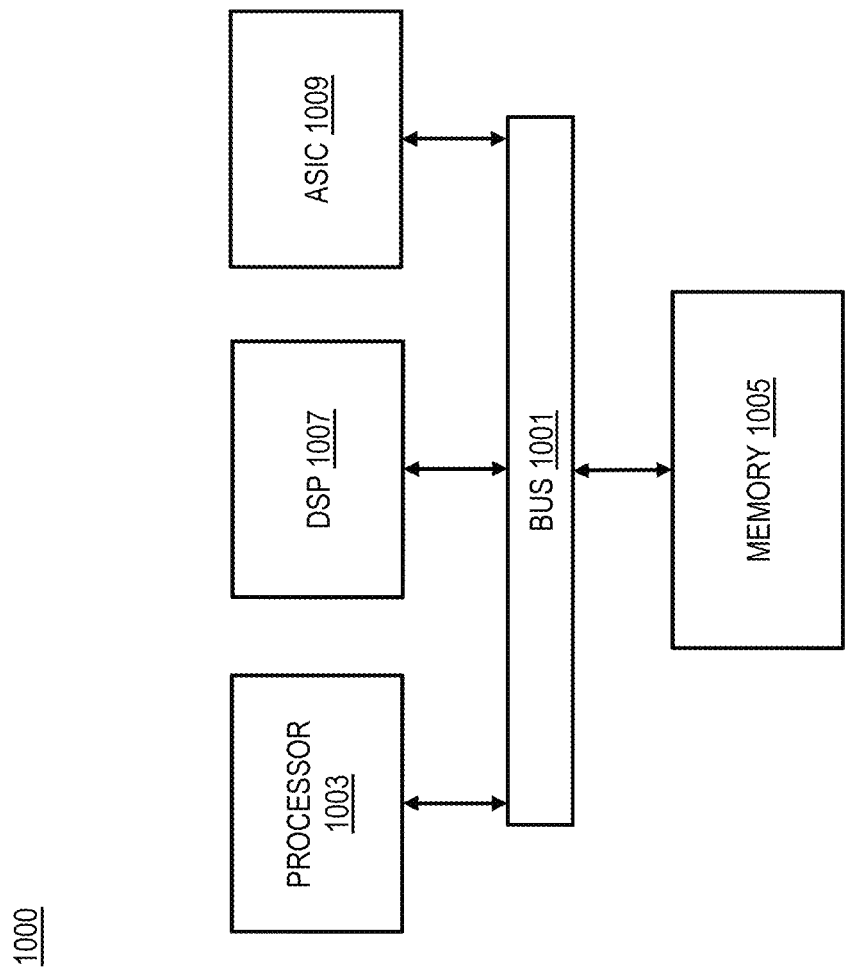
FIG. 10 is a diagram of a chip set that can be used to implement an embodiment of the invention.

FIG. 6 is a flowchart of a process for generating a cleaned object model, according to one embodiment. In various embodiments, the object modeling platform 117 may perform one or more portions of the process 600 and may be implemented in, for instance, a chip set including a processor and a memory as shown in FIG. 10. As such, the object modeling platform 117 can provide means for accomplishing various parts of the process 600, as well as means for accomplishing embodiment of other processes describe herein in conjunction with other components of the system 100. In addition or alternatively, the applications 113 may perform any combination of the steps of the process 600 in combination with the object modeling platform 117 or as a standalone component. Although the process 600 is illustrated and described as a sequence of steps, its contemplated that various embodiments of the process 600 may be performed in any order or combination and need not include all of the illustrated steps.

In step 601, the object modeling platform 117 receives an object model (e.g., a building or similar structure) and a point cloud covering the same area. In one embodiment, the point cloud data is collected from a ground based sensor (e.g., mobile LiDAR from vehicles 109 and/or UEs 111 operating at street level), and the object models that are to be cleaned are generated from sensor data collected form an aerial sensor (e.g., aerial/satellite photogrammetry, or aerial LiDAR). The use of aerial data in combination with street-level data enables the system 100 to process different perspectives of the same object (e.g., from ground level and from an aerial perspective) to provide a more complete view of an object or building. For example, features visible at ground level may not be visible from an aerial perspective, and vice-versa. Nonetheless, it is contemplated that embodiments described herein also are applicable to point cloud data and models generated from the same perspective (e.g., either both ground level or both aerial). It is further noted that although various embodiments have been described with respect to creating a point cloud from LiDAR data, LiDAR is provided only as one example means for creating a point cloud, and is not intended as a limitation to the embodiments described herein. For example, any other sensor data (e.g., stereoscopic imagery, RADAR, structure from motion, etc.) can be use generate a point cloud data that represents or depicts the geometry of an object or building.

In step 603, the object modeling platform 117 processes the point cloud data to determine one or more surface points of the point cloud data. In one embodiment, the one or more surface points represent one or more surfaces of the object (e.g., if the object is a building or similar structure, the surfaces may represent walls of the building). In one embodiment, to facilitate determining the surface points, the object modeling platform can pre-process the point cloud data. For example, in one embodiment, the object modeling platform 117 segments the point cloud data into one or more object points and one or more non-object points. In other words, in a use case where the object is a building or structure with walls, the object modeling platform 117 can classify the one or more points of point cloud data into one or more building points and one or more non-building points, wherein the point cloud data includes a depiction of the building.

Another example of pre-processing includes aligning the point cloud data with associated object model data (e.g., object models corresponding to the same object or building depicted in the point cloud data). In one embodiment, the object modeling platform 117 can either generate on its own or receive alignment information from an external or third party source (e.g., from one or more services 125 and/or content providers 127). The alignment information, for instance, can provide location offset values (e.g., x, y, z offsets) and orientation offset (rotation around the x-, y- and z-axes) with respect to each data set (e.g., model data and point cloud data) so that the respective depiction of the object or building each data set is in alignment (e.g., has a minimal degree or degree below a threshold accuracy of non-overlapping features).

In one embodiment, the alignment information is based on a set of non-coplanar surfaces. Accordingly, the object modeling platform 117 extracts the set of non-coplanar surface from the point cloud data and the model. The object modeling platform 117 can then align the point cloud data and the object model by aligning the set of non-coplanar surfaces in the point cloud data and the model (e.g., using an iterative closest point algorithm).

In one embodiment, the alignment information can be used to align different sets of the point cloud data that were collected by different sensors (e.g., different vehicles 109 and/or UEs 111) or at different times. In other words, a first set of the point cloud data is received from a first source and a second set of the point cloud data is received from a second source. In this embodiment, the object modeling platform 117 can align the first set and the second of point clouds based on an iterative closest point alignment process. In addition or alternatively, as discussed above, the object modeling platform 117 can extract non-planar features (e.g., light poles, traffic signs, lane stripes, and/or other similar objects) for each set of point cloud data. The data sets can then be aligned by aligning (e.g., using iterative closest point or other similar process) to non-planar features of each point cloud data set.

In one embodiment, to determine a surface (e.g., a planar or non-planar wall of a building) from the point cloud data, the object modeling platform 117 iteratively fits the one or more points to one or more wall surfaces to classify the one or more points into the one or more wall points and the one or more non-wall points until a number of the one or more wall points for each of the one or more wall surfaces that cannot be fit is below a threshold. For example, the surface or wall detection can be performed using the RANSAC algorithm described above or other similar analysis capable to extracting wall or surface features from point cloud data.

In one embodiment, the object modeling platform 117 generates a wall model that represents a surface of the object or building based on the determined surface or wall points. In one embodiment, the object modeling platform 117 generates a multi-wall polyline by connecting the one or more wall models determined from the points of the point cloud data. For example, the wall models of the building are represented by polygons or partially by the multi-wall polylines constructed from the wall models.

In step 605, the object modeling platform 117 cuts a model of the object into one or more fragments (e.g., object model fragments) using the one or more surface points and/or wall object models determined above in step 603 (e.g., using the generated multi-wall polyline). In one embodiment, the one or more fragments include one or more object fragments and one or more non-object fragments. In a use case wherein the object is a building, the object modeling platform 117 cuts a model representing the building based on the wall models to generate the cleaned object model.

In one embodiment, the object modeling platform 117 calculates a respective probability that each of the one or more fragments should be included as the one or more object fragments or as the one or more non-object fragments. In one embodiment, the respective probability is calculated based on a coverage percentage of said each of the one or more fragments within a boundary of the object. In one embodiment, the cleaned object model is then stored in a mapping database (e.g., the geographic database 121) for subsequent use (e.g., for generating a visual representation of the building or object in a mapping user interface or display).

The object modeling platform 117 then classifies said each of the one or more fragments as the one or more object fragments or the one or more non-object fragments based on the respective probability. In one embodiment, the one or more fragments is classified as the one or more object fragments when the respective probability is above a threshold value. In one embodiment, the classifying of said each of the one or more fragments is performed using a machine learning classifier based on one or more features of the polygon model, the point cloud data, or a combination thereof.

In one embodiment, the object modeling platform 117 generates or receives classification information about the one or more fragments. The classification of the one or more fragments is then based on the received classification information. For example, the classification information can be metadata (e.g., provided by a service 125 and/or content provider 127) that describes classification features and/or parameters for determining whether a fragment is an object fragment or a non-object fragment for further processing by the object modeling platform 117. In one embodiment, instead of provide the classification features or parameters, the metadata may specify the classification itself (e.g., object versus non-object fragment) without needing the object modeling platform 117 to perform any classification functions with respect to the fragments.

In one embodiment, if the point cloud data has been pre-processed to segment the point cloud data into one or more object points and one or more non-object points (as described above), the object modeling platform 117 can further classify each of the one or more fragments as the one or more object fragments or the one or more non-object fragments based on whether said each of the one or more fragments corresponds points in the point cloud that have been classified as either the one or more object points or the one or more non-object points. For example, because of the relatively low resolution of object models generated from aerial/satellite photogrammetry, the object modeling platform 117 can instead use the generally more detailed point cloud data to more clearly distinguish between object and non-objects (e.g., building and non-buildings).

In step 607, the object modeling platform 117 designates the one or more object fragments as the cleaned object model to represent the object in the mapping database. In other words, the fragments of the cut object model that have been classified as object or building fragments will be used as the cleaned object models. Based on the cutting method above, such classified object fragments fall within the expected boundary or polyline of true object or building.

In step 609, the object modeling platform 117 optionally merges at least one of the one or more object fragments into a single cleaned object model based on one or more criteria. This can be performed, for instance, when the process 600 results in generating more than one model fragments that are classified as object fragments. As noted above, in some cases adjacent object fragments may often be a part of a single real building or object. Accordingly, the object modeling platform 117 can evaluate these adjacent object fragments and merge them back into a single cleaned object model when the at least one of the one or more object fragments, for instance, shares one or more common edges with the cleaned object model.

Figure 7A:
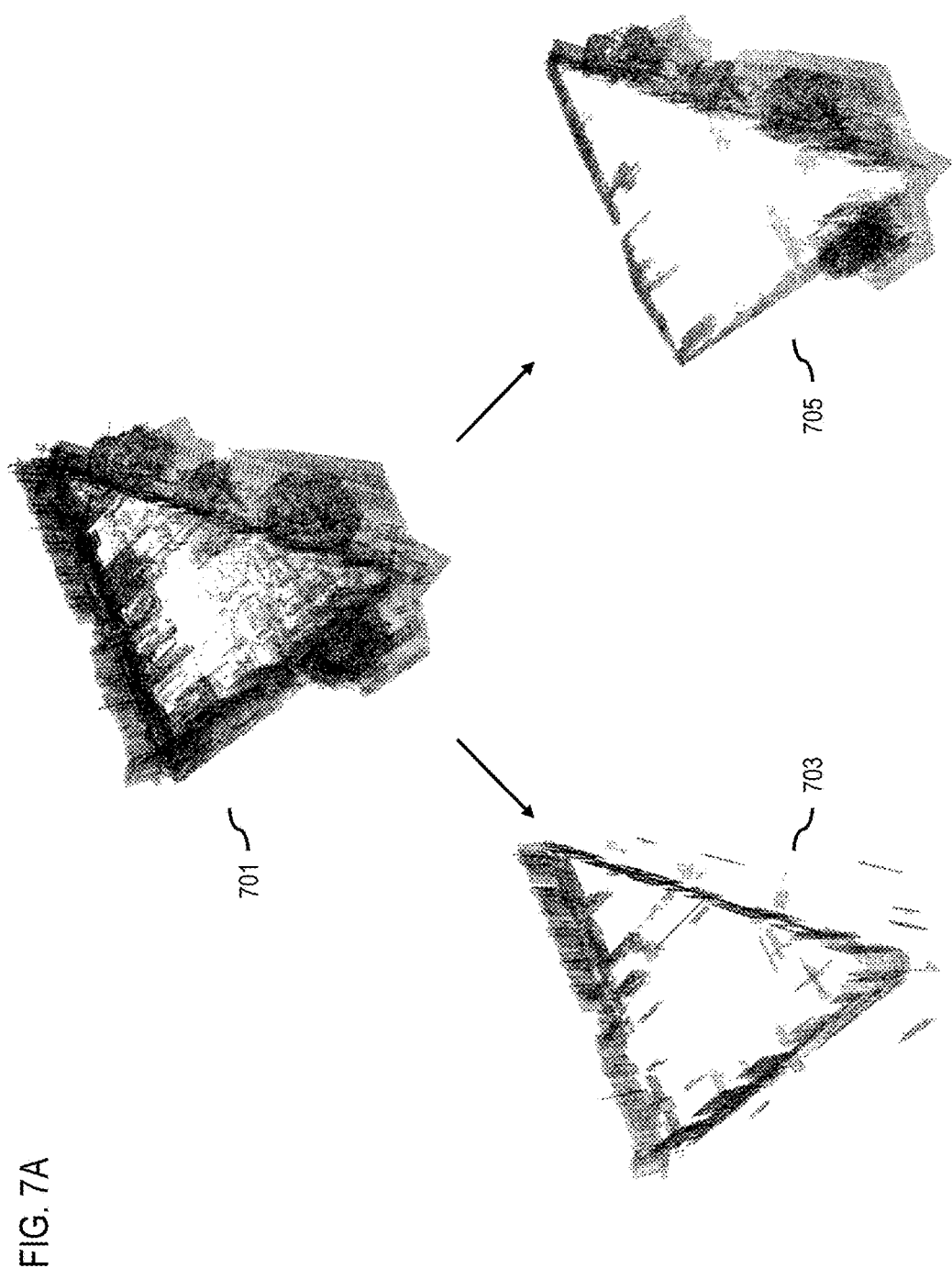
FIG. 7A is a diagram illustrating a process for segmenting point cloud data into object points and non-object points, according to one embodiment.
Figure 7B:
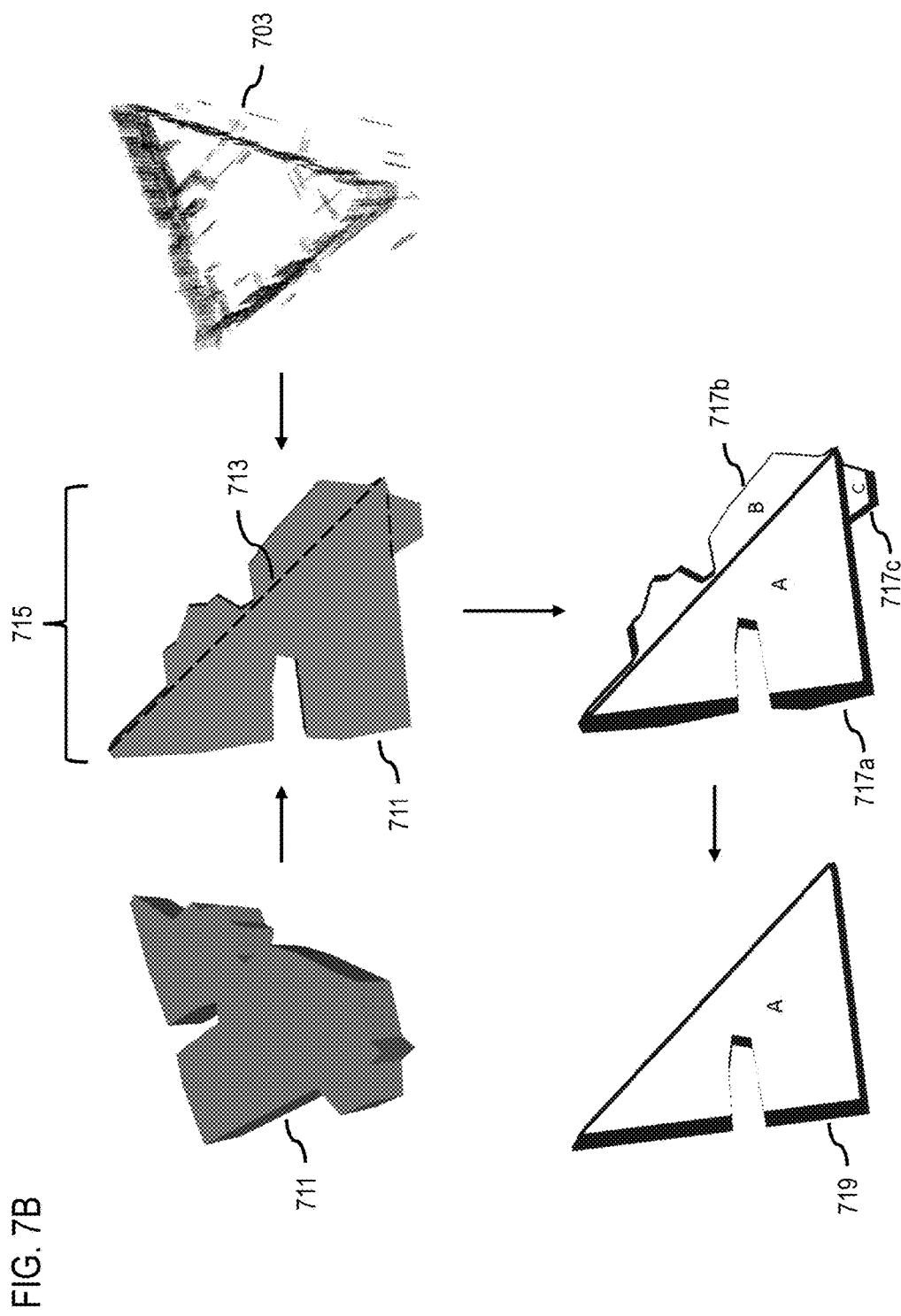
FIG. 7B is a diagram illustrating a process for cutting an object model using wall locations determined from object points segmented from point cloud data, according to one embodiment.

FIGS. 7A-7B are diagrams illustrating a process for cutting an object model to build a cleaned object model, according to one embodiment. For example, FIG. 7A is a diagram illustrating the process for segmenting point cloud data into object points and non-object points, according to one embodiment. As shown, point cloud data 701 that depicts an object of interest (e.g., a building) is received. In this example, the point cloud data represents mobile LiDAR measures of the building and surrounding area. As a result, the point cloud data includes points depicting of the object or building as well as points depicting nearby objects (e.g., nearby trees, paths, etc.).

To distinguish between these points, the object modeling platform 117 performs point cloud segmentation to classify individual points as either building points or non-building points. In one embodiment, this segmentation is performed by extracting walls or surfaces from the point cloud using, for instance, a RANSAC or similar algorithm. Points that fitted to the extracted walls or surfaces are classified as building points 703 and all other points are classified a non-building points 705. As shown, the building points 703 generally fall along vertical planes that represent the detected walls of the building or object of interest.

FIG. 7B is a diagram illustrating a process for cutting an object model using wall locations determined from object points segmented from point cloud data, according to one embodiment. In one embodiment, the process of FIG. 7B is performed following the point cloud segmentation of FIG. 7A. As shown, the object modeling platform 117 receives a raw or uncleaned object model 711 representing a building, and uses the building points 703 to decide where the walls of the building are. Illustration 715 shows the model 711 with a dotted line 713 indicating the detected wall locations.

In one embodiment, the object modeling platform 117 cuts the model 711 using the wall models that were generated from by the walls or surfaces extracted from the building points 703. This cutting results in creating three fragments 717a-717b. In this example, fragment 717a falls entirely within the determined wall models of the building and is classified as a building fragment. However, fragments 717b and 717c fall outside the wall models and are classified as non-building objects. In one embodiment, the fragment 717a (e.g., classified as a building fragment) is designated or presented as the cleaned object model 719.

Figure 7C:
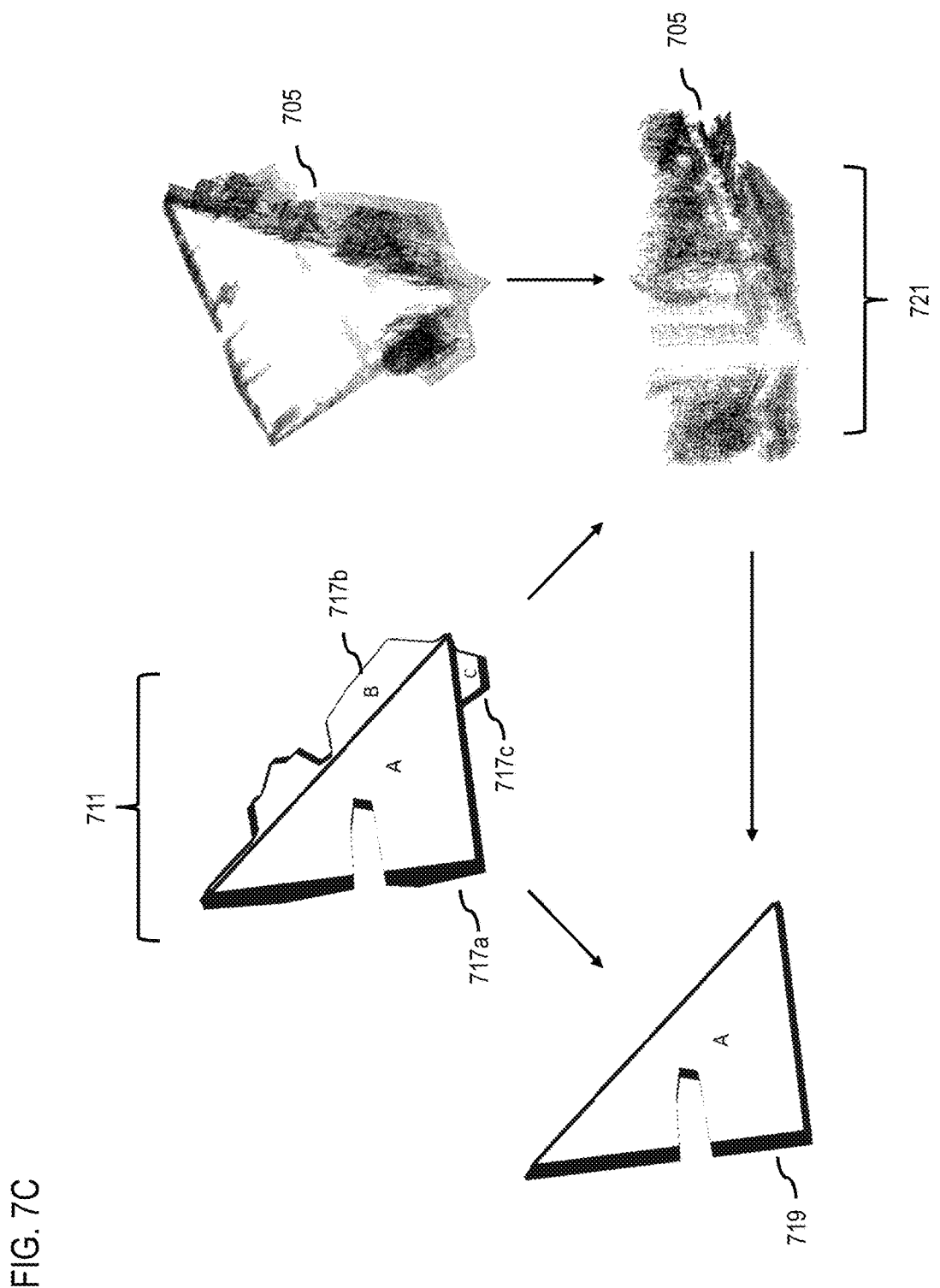
FIG. 7C is a diagram illustrating a process for classifying fragments of an object model based on non-object points segmented from point cloud data, according to one embodiment.

In one embodiment, the object modeling platform 117 can further classify or score the fragments according to the process of FIG. 7C. For example, FIG. 7C is a diagram illustrating a process for classifying fragments of an object model based on non-object points segmented from point cloud data, according to one embodiment. As described above, the point segmentation process results in segmenting a set of non-building points 705 from the point cloud 701. For example, the non-building points 705 can represent objects such as the ground, trees, other street objects, etc., that are nearby the building of interest. Because the non-building points 705 (and the points of the point cloud 701 in general) are location points described with a coordinate system, the object modeling platform 117 can manipulate or present the non-building points 705 from any number perspectives or viewing locations (e.g., the street-level perspective 721 shown in FIG. 7C).

In one embodiment, to object modeling platform 10 can use the footprint information of the fragments 717a-717c cut from the object model 711 to extract point cloud data corresponding to each fragment (e.g., both non-building points 705 and building points 703). In one embodiment, the object modeling platform 117 can use the features (e.g., coverage area percentage relative to a boundary of the building, surface normal, etc.) of the non-building points 705 of each fragment 717a-717c to classify each as either a building or a non-building fragment. Based on this classification, the object modeling platform 117 can determine whether any resulting building or object fragments should be merged into the cleaned object model 719 or any other previously classified building fragments (e.g., fragment 717a) as a single cleaned object model. In this example, the additional classification based on the features did not result in a merging of any other building fragments into the cleaned object model 719.

Figure 8:
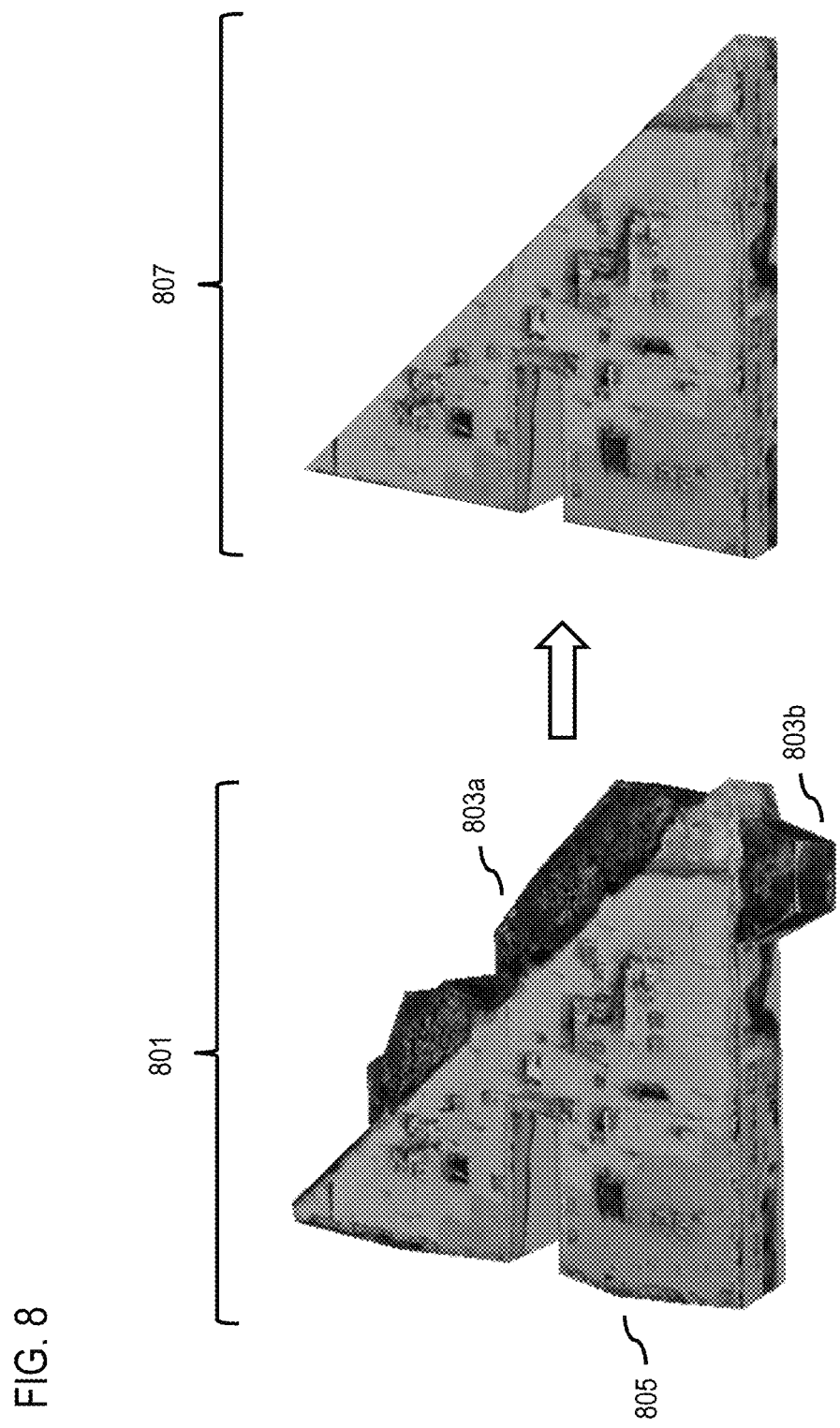
FIG. 8 is diagram illustrating a rendering of a cleaned object model, according to one embodiment.

FIG. 8 is diagram illustrating a rendering of a cleaned object model, according to one embodiment. The example of FIG. 8 illustrates rendering differences and improvements resulting from the various embodiments of the object model clean up processes described herein. In this example, rendering 801 is a visual representation of a building that is generated using an uncleaned or raw object model of the building. The rendering 801 is, for instance, a textured mapped rendering using aerial imagery as a texture applied to the rendered model. As shown the rendering has several problematic artifacts resulting from the underlying object model. For example, adjacent trees 803a and 803b (e.g., non-building objects) have been incorporated into the model. In addition, the relatively low resolution of the aerial imagery used to generate the underlying model has caused imprecision in the straightness of the model walls as illustrated by the bend 805 visible in the rendering 801.

In contrast, rendering 807 is generated from building model that has been cleaned according to the various embodiments described herein. In this example, the cleaning process has eliminated the problematic artifacts by removing the non-object fragments of the model (e.g., the fragments corresponding to the trees 803a and 803b) and straightening the model walls or boundaries. For example, by using the highly detailed point cloud data (e.g., often accurate to the centimeter level), the walls or outlines of the models are more precise and straight relative to the uncleaned model. Accordingly, the rendering 807 more accurately represents the building model and can be used to generate a more accurate and visually appeal representation of the building in mapping user interfaces.

In other words, the various embodiments described herein results in significantly improving object model quality which reducing or eliminating the resource burden associated with manually fixing the object models to achieve similar results. By automating the model cleanup process, the embodiments represent a scalable and efficient method capable of processing large numbers of models without manual user intervention. In one embodiment, the various embodiments advantageously improves object or building model quality in the follow ways: (1) separating non-objects (e.g., trees) from object extrusions or models (e.g., building models); (2) making object or building surfaces smoother and compensate for noise brought by low-quality or low-resolution textures; and (3) separating erroneously connected objects or buildings (e.g., caused by mesh model artifacts).

In addition, the various embodiments can use information from high-resolution (centimeter level) point clouds (e.g., mobile LiDAR data) together with relatively-low resolution but high-location-accuracy aerial mesh data (e.g., surface models or object models generated from aerial/satellite photogrammetry, aerial LiDAR, etc.). For example, because point cloud data is often collected at street level, the street features for alignment, and walls extracted from point cloud data typically can only be seen the point cloud data. By combining the street level data and aerial data, the various embodiments can provide both detailed street-level and building top information, thereby increasing overall model quality.

The processes described herein for generating a cleaned object model for an object in a mapping database may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
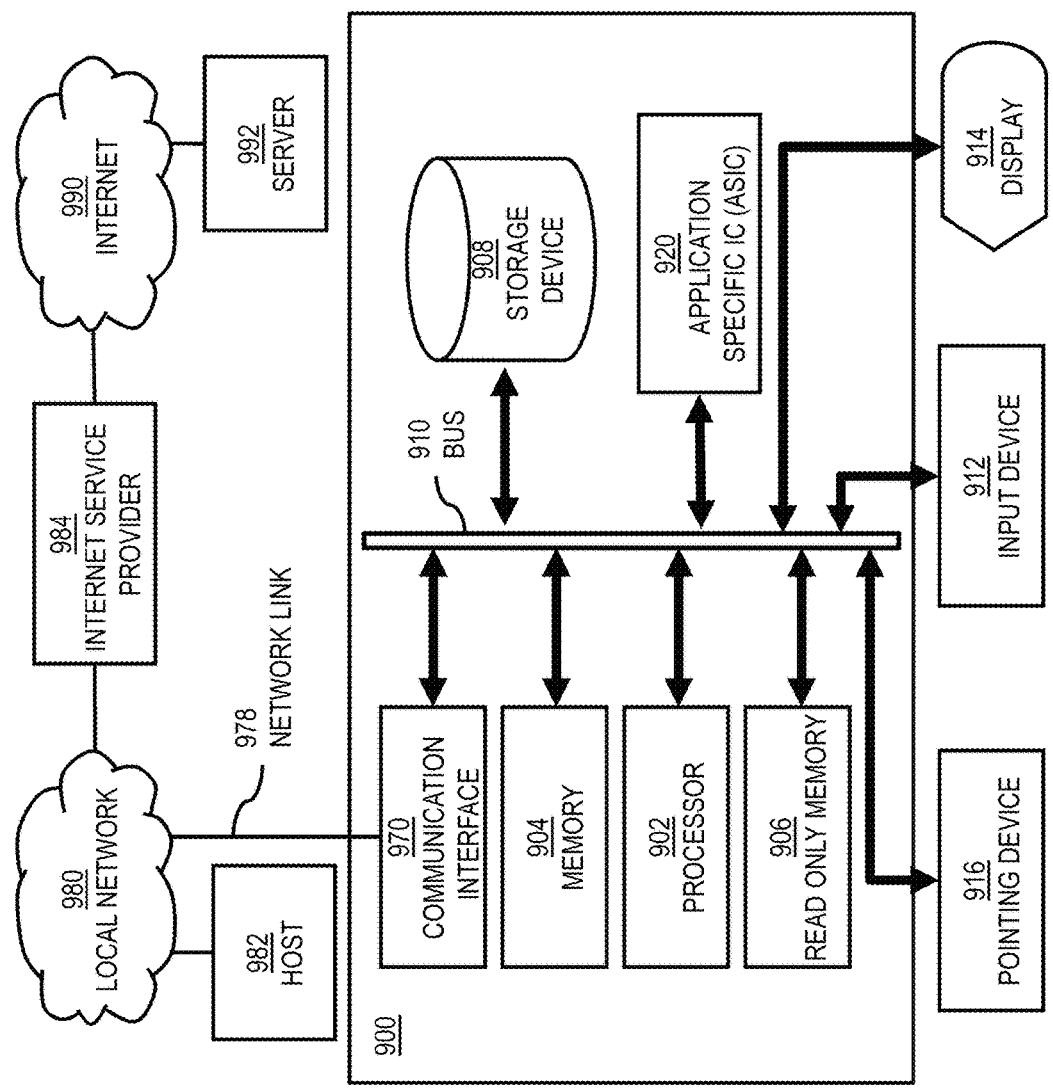
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to generate a cleaned object model for an object in a mapping database as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to generating a cleaned object model for an object in a mapping database. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for generating a cleaned object model for an object in a mapping database. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for generating a cleaned object model for an object in a mapping database, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 119 for generating a cleaned object model for an object in a mapping database.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to generate a cleaned object model for an object in a mapping database as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to generate a cleaned object model for an object in a mapping database. The memory 1005 also stores the data associated with or generated by the execution of the inventive steps.

Figure 11:
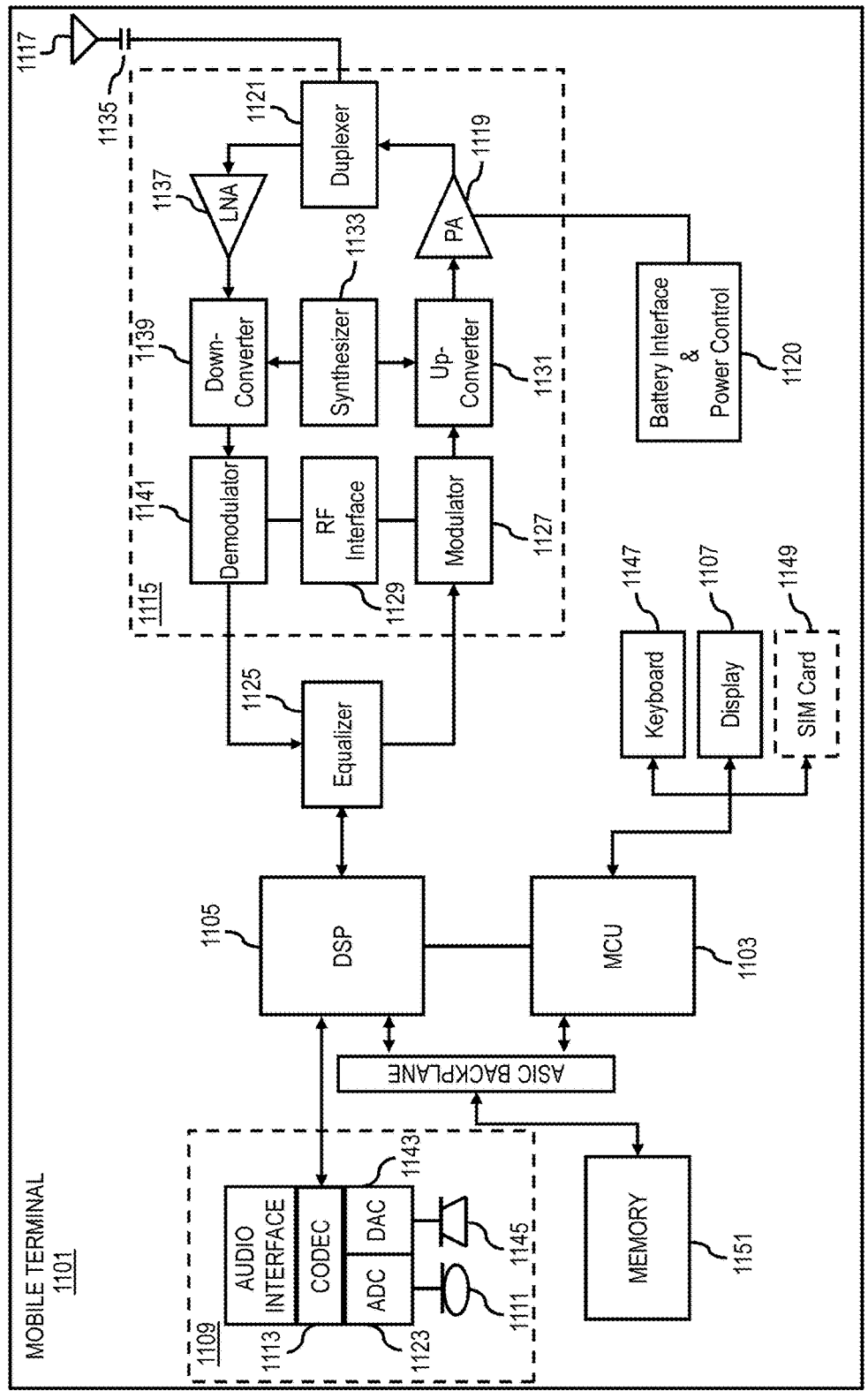
FIG. 11 is a diagram of a mobile terminal (e.g., handset) that can be used to implement an embodiment of the invention.

FIG. 11 is a diagram of exemplary components of a mobile station (e.g., handset) capable of operating in the system of FIG. 1, according to one embodiment. In one embodiment, the mobile station 1101 is the UE 111, the vehicle 109, and/or parts thereof. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to generate a cleaned object model for an object in a mapping database. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims and as described in the flowcharts and diagrams above, it is contemplated that these features can be arranged in any combination and order.

What is claimed is:

1. A method for generating a cleaned object model to represent an object, comprising:
    receiving, by a processor, a model of the object and point cloud data depicting the object;
    processing, by the processor, the point cloud data to determine one or more surface points of the point cloud data, the one or more surface points representing one or more surfaces of the object;
    cutting, by the processor, the model of the object into one or more fragments using the one or more surface points, wherein the one or more fragments include one or more object fragments that fall within a footprint boundary of the object and one or more non-object fragments that fall outside of the footprint boundary of the object; and
    removing, by the processor, the one or more non-object fragments from the model of the object and designating, by the processor, the one or more object fragments as the cleaned object.

2. The method of claim 1, further comprising:
    calculating a respective probability that each of the one or more fragments should be included as the one or more object fragments or as the one or more non-object fragments; and
    classifying said each of the one or more fragments as the one or more object fragments or the one or more non-object fragments based on the respective probability.

3. The method of claim 2, wherein the respective probability is calculated based on a percentage coverage by points of said each of the one or more fragments within the footprint boundary of the object.

4. The method of claim 2, wherein said each of the one or more fragments is classified as the one or more object fragments when the respective probability is above a threshold value.

5. The method of claim 2, wherein the classifying of said each of the one or more fragments is performed using a machine learning classifier based on one or more features of a geometry of the one or more fragments, the point cloud data, or a combination thereof.

6. The method of claim 1, further comprising:
receiving classification information about the one or more fragments; and
classifying each of the one or more fragments as the one or more object fragments or the one or more non-object fragments based on the classification information.

7. The method of claim 1, further comprising:
segmenting the point cloud data into one or more object points and one or more non-object points; and
classifying each of the one or more fragments as the one or more object fragments or the one or more non-object fragments based on whether said each of the one or more fragments corresponds to the one or more object points or the one or more non-object points of the point cloud data.

8. The method of claim 1, further comprising:
merging two or more of the object fragments into the cleaned object model when the two or more object fragments share an edge.

9. The method of claim 1, wherein the point cloud data is collected from a ground based sensor, and wherein the model is generated from sensor data collected from an aerial sensor.

10. The method of claim 1, wherein the object is a building.

11. An apparatus for generating a cleaned object model to represent a building, comprising:
at least one processor; and
at least one memory including computer program code for one or more programs,
the at least one memory and the computer program code configured to, with the at least one processor, cause the apparatus to perform at least the following,
classify one or more points of point cloud data into one or more wall points that are on a footprint boundary of the building and one or more non-wall points that are not on the footprint boundary of the building, wherein the point cloud data includes a depiction of the building;
generate one or more wall models based on the one or more wall points;
cut a model representing the building by removing the one or more non-wall points from the model and using the one or more wall models to generate the cleaned object model; and
store the cleaned object model,
wherein the cleaned object model is used to generate a visual representation of the building including the footprint boundary in a mapping user interface.

12. The apparatus of claim 11, wherein the apparatus is further caused to:
iteratively fit the one or more points to one or more wall planes to classify the one or more points into the one or more wall points and the one or more non-wall points until a number of the one or more wall points for each of the one or more wall planes that cannot be fit is below a threshold.

13. The apparatus of claim 12, wherein the apparatus is further caused to:
generate a multi-wall polyline by connecting the one or more wall models,
wherein the footprint boundary of the building is represented by the multi-wall polyline; and
wherein the cutting of the model is based on the multi-wall polyline.

14. The apparatus of claim 11, further comprising:
receive alignment information for aligning the point cloud data with the model representing the building,
wherein the cutting of the model is based on the alignment information.

15. The apparatus of claim 14, wherein the alignment information is based on a set of non-coplanar surfaces, and wherein the apparatus is further caused to:
extract the set of non-coplanar surfaces from the point cloud data and the model; and
align the point cloud data and the model by aligning the set of non-coplanar surfaces in the point cloud data and the model.

16. The apparatus of claim 11, wherein a first set of the point cloud data is received from a first source and a second set of the point cloud data is received from a second source, and wherein the apparatus is further caused to:
align the first set and the second set based on an iterative closest point alignment process, an alignment of one or more non-planar surfaces, or a combination thereof.

17. A non-transitory computer-readable non-transitory storage medium for generating a cleaned object model to represent a building, carrying one or more sequences of one or more instructions which, when executed by one or more processors, cause an apparatus to perform:
classifying one or more points of point cloud data into one or more building points that are within a footprint boundary of the building and one or more non-building points that are not within the footprint boundary of the building, wherein the point cloud data includes a depiction of the building;
generating one or more polylines of one or more wall models of the building based on one or more building points determined from the point cloud data;
cutting a model representing the building by removing the one or more non-building points from the model and using the one or more wall models to generate the cleaned object model; and
storing the cleaned object model,
wherein a visual representation of the building including the footprint boundary in a mapping user interface is based on the cleaned object model.

18. The non-transitory computer-readable non-transitory storage medium of claim 17, wherein the apparatus is further caused to perform:
downsampling the point cloud data in uniform density prior to the classifying the one or more points of the point cloud data.

19. The non-transitory computer-readable non-transitory storage medium of claim 17, wherein the classifying of the one or more points of the point cloud into the one or more building points and the one or more non-building points is based on a surface normal, an area size, an elevation, or a combination thereof with respect to the one or more wall points.

20. The non-transitory computer-readable storage medium of claim 17, wherein the apparatus is further caused to perform:
determining an interior wall or an interior surface of the building represented in the point cloud data; and
discarding the one or more points corresponding to the interior wall or the interior surface from the point cloud data.

* * * * *